United States Patent

[11] 3,607,778

| [72] | Inventors | Robert M. Lincoln Moylan; Joseph A. Meyers, III, Springfield, both of Pa. |
|---|---|---|
| [21] | Appl. No. | 739,612 |
| [22] | Filed | June 25, 1968 |
| [45] | Patented | Sept. 21, 1971 |
| [73] | Assignee | Atlantic Richfield Company Philadelphia, Pa. |

[54] ANIONIC SURFACE-ACTIVE AGENTS FROM EPOXYALKANES AND METHOD FOR THEIR PRODUCTION
3 Claims, No Drawings

[52] U.S. Cl...................................................... 252/353, 252/138, 252/161, 260/458

[51] Int. Cl........................................................ B01f 17/04, C11d 1/16
[50] Field of Search........................................... 260/458, 615 B; 252/353

[56] References Cited
UNITED STATES PATENTS

| 1,897,741 | 2/1933 | Ulrich et al................... | 252/353 X |
| 3,317,508 | 5/1967 | Winquist, Jr. et al......... | 260/615 X |

*Primary Examiner*—Richard D. Lovering
*Attorney*—Robert R. Cochran

ABSTRACT: Random epoxyalkanes in the $C_8$–$C_{20}$ range are reacted with ethylene glycol to produce a hydroxy ether having a primary alcohol group, which reaction product is sulfated to produce an anionic surface active agent.

ANIONIC SURFACE-ACTIVE AGENTS FROM EPOXYALKANES AND METHOD FOR THEIR PRODUCTION

BACKGROUND OF THE INVENTION

1. Field of the Invention

This invention relates to anionic surface-active agents produced by reacting random $C_8$–$C_{20}$ epoxyalkanes with ethylene glycol in the presence of a $BF_3$-etherate catalyst to produce a hydroxy ether containing a primary alcohol group and thereafter converting the hydroxy ether by sulfation to an anionic surface-active agent.

2. Prior Art

The reaction of 1, 2-epoxyalkanes with various reagents such as water, methyl alcohol, ethylene glycol, glycerol, sorbitol and the like has been described in the literature. The 1, 2epoxyalkanes react with these reagents at high yields and rather readily. If, however, random epoxides, i.e. epoxyalkanes characterized by having the oxirane ring formed of adjacent carbon atoms other than the 1, 2-carbon atoms of the chain, are reacted with reagents such as water, methyl alcohol and the like, the reaction rates are slow and the yields are poor. Consequently, it was very surprising in accordance with this invention that ethylene glycol will react readily with random epoxyalkanes to produce high yields of the desired hydroxy ether having a primary alcohol group. In view of this surprising fact, it is to be expected that there would be no prior art on this reaction and none is known wherein ethylene glycol is reacted with random epoxyalkanes. Since this reaction is not shown in the prior art, there is no prior art known showing sulfation of the hydroxy ethers produced by this reaction.

The random epoxyalkanes can be produced more economically than the 1, 2-epoxyalkanes. Consequently, it is highly desirable that there be a method for producing surface active agents from such raw materials.

SUMMARY OF THE INVENTION

In accordance with this invention random epoxyalkanes in the range of from 8 to 20 carbon atoms are reacted with one equivalent of ethylene glycol by $BF_3$-etherate catalysis to give a hydroxy ether having a primary alcohol group. Such reactions, in accordance with this invention, can be carried out in yields in excess of 90 percent.

The primary alcohol can react by sulfation to give an anionic surface active compound, again in yields in excess of 90 percent. The surface active agents produced in accordance with this method and from these random epoxides have been found to have excellent detergent characteristics.

It is an object of this invention therefore to provide a method for converting random epoxyalkanes to anionic surface active agents.

It is another object of this invention to provide anionic surface active agents from random epoxyalkanes.

It is another object of this invention to react random epoxyalkanes with ethylene glycol to produce hydroxy ethers having a primary alcohol group.

It is another object of this invention to react random epoxyalkanes with ethylene glycol to produce hydroxy ethers having a primary alcohol group and reacting the alcohol group to produce anionic surface active agents.

Other objects of this invention will be apparent from the following description of the preferred embodiments and from the claims.

DESCRIPTION OF THE PREFERRED EMBODIMENTS

The random epoxyalkanes which are utilized in this invention are produced conveniently from straight chain internal olefins produced by the dehydrohalogenation of straight chain monochloroparaffins in the $C_8$–$C_{20}$ range. The thermal chlorination of straight chain paraffins to produce monochloroparaffins is practiced commercially. In general, the method involves admixing chlorine with the straight chain paraffin hydrocarbon in the desired carbon number range at temperatures of 180° F. to 450° F., preferably from about 230° F. to 390° F. and carrying out the reaction so that only about 20 percent of the paraffins are converted.

Under these conditions approximately 90 percent or more of the chloroparaffins produced are the monochloroparaffins. After separation of the unreacted paraffin and polychloroparaffins such as by distillation the monochloroparaffins are dehydrohalogenated to produce internal olefins.

The dehydrohalogenation step maybe carried out either thermally at temperatures from about 800° F.. to 950° F. or catalytically at temperatures of about 400° F. to 500° F. utilizing a high surface material as the catalyst, for example, activated carbon. The resulting internal olefins will have the double bond located along the chain since in the chlorination step the chlorine is substituted randomly along the chain.

These internal olefins can be epoxidized in accordance with well-known methods, for example, by the use of peracids such as peracetic acid or by the more recent process involving the use of a hydroperoxide such as tertiary butyl hydroperoxide and a molybdenum-containing catalyst, for example, molybdenum hexacarbonyl.

The random epoxyalkanes produced by these steps are reacted with one equivalent of ethylene glycol in the presence of a $BF_3$ etherate complex as the catalyst. The compound formed by this reaction is a hydroxy ether containing a primary alcohol group. This reaction may be illustrated by the following equation:

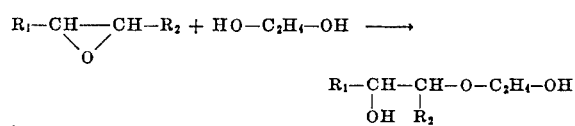

wherein $R_1$ is a straight chain alkyl group containing from 1 to 17 carbon atoms and $R_2$ is a straight chain alkyl group having from 1 to 17 carbon atoms with the sum of the carbon atoms in $R_1$ plus $R_2$ being in the range of from 6 to 18. These compounds have been found useful as intermediates in the production of anionic surface active agents by the method to be described.

The $BF_3$-etherate complex catalyst utilized in this invention is the conventional commercial catalyst.

The hydroxy ethers having the primary alcohol group produced as described are sulfated by conventional methods, for example, by reaction with chlorosulfonic acid under conventional reaction conditions. Other well-known sulfating agents can also be used such as sulfamic acid, fuming sulfuric acid and the like. These reactions are well known and completely described in the technical literature and patents. In all cases the reaction temperature is held low enough to provide reaction with the primary alcohol in accordance with usual conventional practice.

If unusual conditions are employed such as nonconventional high reaction temperatures, there is the danger the secondary alcohol group will also be attacked and undesirable byproducts formed. Since this information has been published exhaustively, further discussion is unnecessary.

After neutralization the sulfated compound can be utilized as a surface active agent, for example, in detergent compositions. Any of the well-known neutralization agents can be used, but the preferred salts are the alkali metal and ammonium.

The following examples are provided for the purpose of illustrating the invention in greater detail and should not be construed as limiting the invention solely thereto.

EXAMPLE 1

To a 1,000 ml. three-necked flask provided with a condenser, stirrer and dropping funnel was added 168 grams of a mixture of internal olefins having 16 carbon atoms in the molecule. There was substantially no alpha-olefin, i.e. noninternal olefin, in the mixture. There was added 168 grams of benzene and 5 grams of sodium acetate. The temperature was raised to 60 C. and 111 grams of 51.3 percent peracetic acid was added dropwise. The temperature was controlled to 60° C. by water cooling and by controlling the rate of addition of the peracetic acid. The acid was added over a period of 1 hour and 35 minutes and thereafter the mixture was stirred for an additional 30 minutes. The reaction solution was water-washed, washed with a dilute aqueous solution of sodium carbonate, washed with a dilute aqueous solution of sodium sulfite and finally dried over potassium carbonate. The benzene was vacuum distilled from the solution. The epoxide product was found to contain only about 15 percent unreacted olefin.

EXAMPLE II

To a three-necked flask provided with a condenser, stirrer and dropping funnel was added 6.2 grams (0.1 moles) of ethylene glycol. Two drops of BF$_3$-etherate catalyst were added and with stirring the temperature was brought to 110° C. To this solution was added dropwise 24.0 grams (0.1 moles) of random C$_{16}$ epoxyalkanes produced as described in example I. The epoxyalkanes were added at a rate sufficient to maintain a temperature of 110° C.

After the addition of the epoxyalkanes was completed the mixture was stirred for one additional hour. An equal volume of benzene was added to the solution and an analytical sample showed that only a small amount of epoxide as determined by gas/liquid chromatographic analysis remained in the reaction mixture.

The reaction mixture was shaken with water to remove the ethylene glycol, washed with a dilute sodium carbonate aqueous solution, again washed with water, finally dried over magnesium sulfate and filtered. After evaporation there was obtained 29.8 grams of product which was identified as the hydroxy ether of the formula:

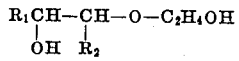

with R$_1$ being an alkyl group having from 1 to 13 carbon atoms and R$_2$ an alkyl group having from 1 to 13 carbon atoms, the sum of the carbon atoms in R$_1$ plus R$_2$ being 14.

EXAMPLE III

There was dissolved in 60 ml. of hexane 15.6 grams (0.06 moles) of the random C$_{16}$ hydroxy ether produced in example II. The mixture was cooled to 0° C. and then there was added dropwise 7.2 grams (0.06 moles) of chlorosulfonic acid, ClSO$_2$OH, the solution turned amber in color and was allowed to warm to room temperature. It was stirred for 1 hour and thereafter poured over ice and neutralized with a 10 percent sodium hydroxide aqueous solution. The material was deoiled with ethanol-water and hexane. The ethanol-water solution was evaporated to dryness and 19.7 grams of the sodium salt of the hydroxy ether sulfate was obtained.

This material showed excellent foaming and surface active properties in aqueous solutions and was found to have excellent detergency characteristics when tested by means of the Terg-O-Tometer detergency test described in the Journal of the American Oil Chemists' Society, Vol. 42, pages 723–727 (1965). In this test a formulation was prepared consisting of, in parts by weight: the sodium hydroxyether sulfate-10; sodium carbonate-35; sodium metasilicate-7; sodium sulfate-46; sodium carboxy methylcellulose-1 and sodium hydroxide-1. This formulation was dissolved in 150 p.p.m. hardness water such that there was a 0.15 solid concentration of the formulation in water. The test was carried out at 120° F. for 3 cycles. The detergency value of this formulation was found to be 74, showing it to be competitive with the best alkylbenzene sulfonate type detergents in similar built formulations.

When other random epoxyalkanes are converted to detergents in the manner described, similar results are obtained although the detergency values obtained vary with molecular weight in accordance with the well-known characteristics of sulfated detergent-type compounds. Likewise other alkali metal or ammonium salts can be produced.

As many possible embodiments can be made of this invention without departing from the broad scope thereof, it is to be understood that all matter herein set forth is to be interpreted as illustrative and not as unduly limiting the invention.

We claim:

1. A method for the production of anionic surface active agents from random epoxyalkanes having from 8 to 20 carbon atoms in the molecule and characterized by having the formula

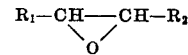

wherein R$_1$ is a straight chain alkyl group having from 1 to 17 carbon atoms, R$_2$ is a straight chain alkyl group having from 1 to 17 carbon atoms with the sum of the carbon atoms in R$_1$ plus R$_2$ being in the range of from 6 to 18, which comprises contacting said epoxyalkanes with an equimolar amount of ethylene glycol in the presence of a BF$_3$-etherate catalyst thus producing the corresponding hydroxy ethers having the formula

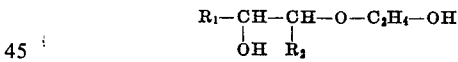

sulfating said hydroxy ethers at a reaction temperature sufficiently low to provide reaction with the primary alcohol group of said hydroxy ethers and neutralizing to produce the alkali metal or ammonium salt of the sulfate.

2. The anionic surface active agents produced in accordance with the method of claim 1.

3. The method according to claim 1 wherein the random epoxyalkanes contain 16 carbon atoms and the salt is the sodium salt.